US008271472B2

(12) United States Patent
de Morentin Martinez et al.

(10) Patent No.: US 8,271,472 B2
(45) Date of Patent: Sep. 18, 2012

(54) SYSTEM AND METHOD FOR EXPOSING BOTH PORTAL AND WEB CONTENT WITHIN A SINGLE SEARCH COLLECTION

(75) Inventors: Eric de Morentin Martinez, Manly (AU); Mark Carl Hampton, Newtown (AU); Stefan Hepper, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 329 days.

(21) Appl. No.: 12/372,054

(22) Filed: Feb. 17, 2009

(65) Prior Publication Data

US 2010/0211559 A1 Aug. 19, 2010

(51) Int. Cl.
*G06F 7/00* (2006.01)
*G06F 17/30* (2006.01)

(52) U.S. Cl. ......... 707/707; 707/E17.014; 707/E17.017; 715/742; 715/760; 709/218; 709/223; 709/224

(58) Field of Classification Search ............... 707/999.3, 707/707, E17.014, E17.017; 715/742, 760; 709/218, 223, 224
See application file for complete search history.

(56) References Cited

U.S. PATENT DOCUMENTS

| | | | |
|---|---|---|---|
| 6,918,090 B2* | 7/2005 | Hesmer et al. ............... | 715/760 |
| 6,987,987 B1* | 1/2006 | Vacanti et al. ............... | 715/705 |
| 7,346,843 B2* | 3/2008 | Hind et al. .................. | 715/234 |
| 7,395,260 B2* | 7/2008 | Oral et al. .............. | 707/999.003 |
| 7,421,421 B2* | 9/2008 | Newbold et al. ....... | 707/999.001 |
| 2003/0046311 A1* | 3/2003 | Baidya et al. ................ | 707/200 |
| 2003/0167315 A1* | 9/2003 | Chowdhry et al. ........... | 709/218 |
| 2004/0078371 A1* | 4/2004 | Worrall et al. .................... | 707/9 |
| 2004/0111465 A1* | 6/2004 | Chuang et al. ............... | 709/203 |
| 2004/0111467 A1* | 6/2004 | Willis .......................... | 709/203 |
| 2004/0205555 A1* | 10/2004 | Hind et al. .................... | 715/513 |
| 2005/0060721 A1* | 3/2005 | Choudhary et al. .......... | 719/318 |
| 2005/0114306 A1* | 5/2005 | Shu et al. ......................... | 707/3 |
| 2005/0154719 A1* | 7/2005 | Choudhary et al. ............. | 707/3 |
| 2005/0154986 A1* | 7/2005 | Bartek et al. .................. | 715/714 |

(Continued)

FOREIGN PATENT DOCUMENTS

WO WO2008035137 3/2008

OTHER PUBLICATIONS

Bethel, Wes, et al., "VisPortal: Deploying grid-enabled visualization tools through a web-portal interface", Workshop on Advanced Collaborative Environments, Seattle, WA, Jun. 2003, pp. 1-8.*

(Continued)

*Primary Examiner* — John E Breene
*Assistant Examiner* — Anh Ly
(74) *Attorney, Agent, or Firm* — Holland & Knight LLP; Brian J. Colandreo, Esq.; Jeffrey T. Placker, Esq.

(57) ABSTRACT

A portal having one or more associated data sources is defined, the portal including one or more portlets for displaying information associated with the one or more associated data sources. An index of the one or more associated data sources is generated. A search query is transmitted to a search engine. The index is searched for data associated with the search query. A result set is received based, at least in part, upon the index and the data associated with the search query.

12 Claims, 8 Drawing Sheets

U.S. PATENT DOCUMENTS

| | | | |
|---|---|---|---|
| 2006/0036954 A1* | 2/2006 | Satyadas et al. | 715/742 |
| 2006/0122872 A1* | 6/2006 | Stevens et al. | 705/5 |
| 2006/0282482 A1* | 12/2006 | Castro et al. | 707/204 |
| 2007/0073734 A1* | 3/2007 | Doan et al. | 707/100 |
| 2007/0136235 A1* | 6/2007 | Hess | 707/2 |
| 2007/0136329 A1 | 6/2007 | Kussmaul et al. | |
| 2007/0179935 A1* | 8/2007 | Lee et al. | 707/3 |
| 2007/0186153 A1* | 8/2007 | Hind et al. | 715/513 |
| 2007/0209006 A1 | 9/2007 | Arthurs et al. | |
| 2007/0282673 A1* | 12/2007 | Nagpal et al. | 705/11 |
| 2007/0282879 A1* | 12/2007 | Degenkolb et al. | 707/101 |
| 2007/0283425 A1* | 12/2007 | Ture et al. | 726/5 |
| 2008/0033943 A1* | 2/2008 | Richards et al. | 707/E17.017 |
| 2008/0046825 A1* | 2/2008 | Bedi et al. | 715/742 |
| 2008/0065608 A1* | 3/2008 | Liesche et al. | 707/3 |
| 2008/0134014 A1* | 6/2008 | Hind et al. | 715/205 |
| 2008/0201645 A1* | 8/2008 | Francis et al. | 715/742 |
| 2008/0243784 A1* | 10/2008 | Stading | 707/3 |
| 2008/0243799 A1* | 10/2008 | Rozich et al. | 707/3 |
| 2008/0244429 A1* | 10/2008 | Stading | 715/764 |
| 2009/0024574 A1* | 1/2009 | Timmons | 707/3 |

OTHER PUBLICATIONS

Weinreich, Rainer, et al., "A Component Model for Integrating Remote Applications and Services via Web Portals", Journal of Object Technology, vol. 6, No. 8, Sep./Oct. 2007, pp. 67-94.*

"IBM DB2 Information Integrator V8.1", IBM Software Announcement 203-134, May 20, 2003, 19 pages.*

Ferguson, Donald F., et al., "Service-oriented architecture: Programming model and product architecture", IBM systems Journal, vol. 44, No. 4, Oct. 2005, pp. 753-780.*

Xiang, Xiaorong, et al., "A Service-oriented Data Integration and Analysis Environment for in Silico Experiments and Bioinformatics Research", HICSS '07, Waikoloa, HI, Jan. 2007, pp. 1-10.*

Gibbins, Hussein, et al., "Gridscape II: An extensible grid monitoring portal architecture and its integration with Google Maps", International Journal of Parallel, Emergent and Distributed Systems, vol. 23, No. 2, Apr. 2008, pp. 153-170.*

"Introduction to JSR 168—The Java Portlet Specification", Sun Microsystems, Inc., Santa Clara, CA, © 2003, pp. i-ii and 1-17.*

Microsoft Computer Dictionary, 5th Edition, Microsoft Press, Redmond, WA, © 2002, pp. 255, 413 and 564.*

Linwood, Jeff, et al., Building Portals with the Java Portlet API, Apress, Berkeley, CA, © 2004, 90 pages.*

Novotny, Jason, et al., "GridSphere: a portal framework for building collaborations", Concurrency and Computation: Practice and Experience, vol. 16, John Wiley & Sons, Ltd., © 2004, pp. 503-513.*

Microsoft Computer Dictionary, 5th Edition, Microsoft Press, Redmond, WA, © 2002, p. 392.*

Oscar Díaz a, Arantza Irastorza a, Jesús Sánchez Cuadrado, Luis M. Alonso—"From page-centric to portlet-centric Web development: Easing the transition using MDD"—Information and Software Technology—vol. 50, Issue 12, Nov. 2008, pp. 1210-1231.*

Jingyu Song, Jun Wei, Shuchao Wan and Hua Zhong—"A Presentation Feature Based Approach to Improving Interactive Web Service Discovery in Web Portals"—IEEE International Conference on e-Business Engineering (ICEBE'06) Oct. 2006 (pp. 563-570).*

* cited by examiner

FIG. 8

SYSTEM AND METHOD FOR EXPOSING BOTH PORTAL AND WEB CONTENT WITHIN A SINGLE SEARCH COLLECTION

TECHNICAL FIELD

This disclosure relates to portals and, more particularly, to a method of searching/exposing information relative to portlets within a portal.

BACKGROUND

Conventional portal systems generally allow users to utilize portlets to provide information from diverse sources in a unified manner. Users may typically select and configure the portlets based on their own interests and/or preferences. One portlet that is common to many users enables the users to perform a web-based search. Often, this portlet generates search results that are only relevant to the search query input by the user. It may often be useful for a user to perform a search, via a portal system, that provides results that are relevant to the user's selected/configured portlets, as the information provided by those portlets may yield results that are more relevant to the interests of the user.

SUMMARY OF DISCLOSURE

In a first implementation, a computer program product includes a computer readable medium having a plurality of instructions stored on it. When executed by a processor, the instructions cause the processor to perform operations including defining a portal having one or more associated data sources, the portal including one or more portlets for displaying information associated with the one or more associated data sources. An index of the one or more associated data sources is generated. A search query is transmitted to a search engine. The index is searched for data associated with the search query. A result set is received based, at least in part, upon the index and the data associated with the search query.

One or more of the following features may be included. The portal may include a predefined organizational structure of the one or more portlets within the portal. Defining the portal may include generating a list of the one or more associated data sources. Parsing the result set may be based, at least in part, upon the list of the one or more associated data sources. The parsed result set corresponding to the one or more portlets may be provided. Providing the parsed result set corresponding to the one or more portlets may include providing the parsed result set corresponding, at least in part, to the predefined organizational structure of the one or more portlets within the portal.

According to another implementation, a computing system includes a processor and a memory module coupled with the processor. A first software module is executable by the processor and the memory module. The first software module is configured to define a portal having one or more associated data sources, the portal including one or more portlets for displaying information associated with the one or more associated data sources. A second software module is executable by the processor and the memory module. The second software module is configured to generate an index of the one or more associated data sources. A third software module is executable by the processor and the memory module. The third software module is configured to transmit a search query to a search engine. A fourth software module is executable by the processor and the memory module. The fourth software module is configured to search the index for data associated with the search query. A fifth software module is executable by the processor and the memory module. The fifth software module is configured to receive a result set based, at least in part, upon the index and the data associated with the search query.

One or more of the following features may be included. The portal may include a predefined organizational structure of the one or more portlets within the portal. Defining the portal may include generating a list of the one or more associated data sources. Parsing the result set may be based, at least in part, upon the list of the one or more associated data sources. The parsed result set corresponding to the one or more portlets may be provided. Providing the parsed result set corresponding to the one or more portlets may include providing the parsed result set corresponding, at least in part, to the predefined organizational structure of the one or more portlets within the portal.

According to yet another implementation, a computer implemented method includes defining a portal having one or more associated data sources, the portal including one or more portlets for displaying information associated with the one or more associated data sources. An index of the one or more associated data sources is generated. A search query is transmitted to a search engine. The index is searched for data associated with the search query. A result set is received based, at least in part, upon the index and the data associated with the search query. The result set is displayed on a client electronic device.

One or more of the following features may be included. The portal may include a predefined organizational structure of the one or more portlets within the portal. Defining the portal may include generating a list of the one or more associated data sources. Parsing the result set may be based, at least in part, upon the list of the one or more associated data sources. The parsed result set corresponding to the one or more portlets may be provided. Providing the parsed result set corresponding to the one or more portlets may include providing the parsed result set corresponding, at least in part, to the predefined organizational structure of the one or more portlets within the portal.

The details of one or more implementations are set forth in the accompanying drawings and the description below. Other features and advantages will become apparent from the description, the drawings, and the claims.

DETAILED DESCRIPTION OF EXEMPLARY EMBODIMENTS

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or non-transitory computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or non-transitory computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
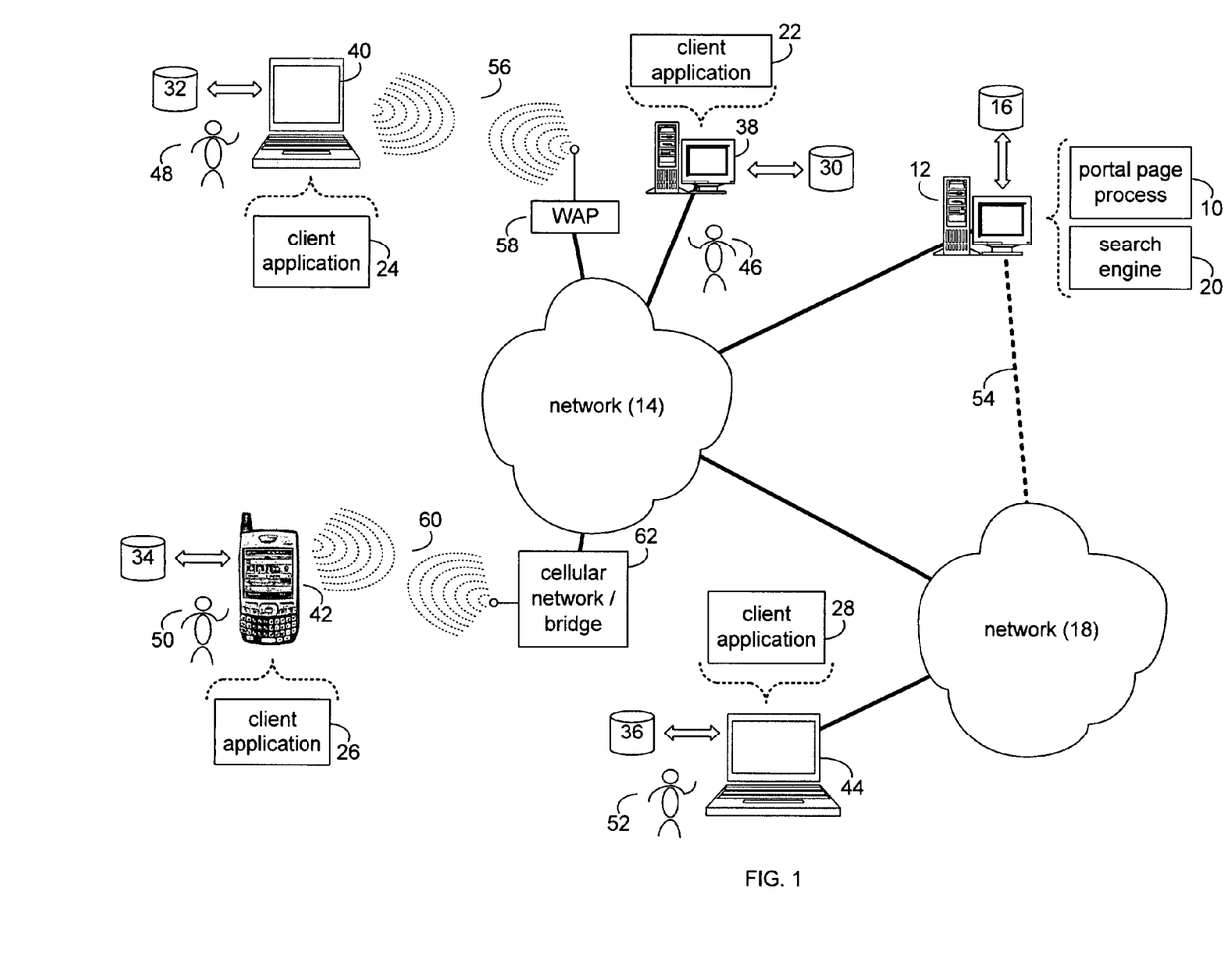
FIG. 1 diagrammatically depicts a portal page process and a search engine coupled to a distributed computing system.

Referring to FIG. 1, there is shown portal page process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® XP Server; Novell® Netware®; or Red Hat® Linux®, for example (Microsoft and Windows are registered trademarks of Microsoft Corporation in the United States, other countries, or both; Novell and NetWare are registered trademarks of Novell Corporation in the United States, other countries, or both; Red Hat is a registered trademark of Red Hat Corporation in the United States, other countries, or both; and Linux is a registered trademark of Linus Torvalds in the United States, other countries, or both).

As will be discussed below in greater detail, portal page process 10 may define a portal including one or more portlets, the one or more portlets having one or more associated data sources. A search query may be transmitted to a search engine, the search query including the one or more associated data sources as a search parameter. A result set may be received, the result set based, at least in part, upon the search query.

The instruction sets and subroutines of portal page process 10, which may be configured as one or more software modules, and which may be stored on storage device 16 coupled to server computer 12, may be executed by one or more processors (not shown) and one or more memory modules (not shown) incorporated into server computer 12. Storage device 16 (i.e., a non-transitory computer readable medium) may include but is not limited to: a hard disk drive; a solid state drive; a tape drive; an optical drive; a RAID array; a random access memory (RAM); and a read-only memory (ROM).

Server computer 12 may execute a web server application, examples of which may include but are not limited to: Microsoft IIS, Novell Webserver™, or Apache® Webserver, that allows for HTTP (i.e., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Server computer 12 may execute search engine 20, an example of search engine 20 may include, but is not limited to, OmniFind®, by IBM, currently at http://www-01.ibm-.com/software/data/enterprise-search/omnifind-enterprise/, and FunnelBack Enterprise®, by FunnelBack, currently at http://funnelback.com/Products/Enterprise.shtml. Search engine 20 may provide information to be displayed (e.g., on user accessible portal pages) via client applications 22, 24, 26, 28, examples of which may include but are not limited to web browsers (e.g., Microsoft Internet Explorer®, Apple® Safari®, etc.) or a custom interface application. (Internet Explorer is a registered trademark of Microsoft Corporation in the United States, other countries, or both, and Apple and Safari are registered trademarks of Apple Inc. in the United States, other countries, or both).

Additionally/alternatively, search engine 20 may interface with one or more third-party search utilities. For example, search engine 20 may provide the information to be displayed (as described above) by interfacing with the Google Web Search Engine, by Google Inc., currently at http://www-.google.com. Portal page process 10 may be a stand alone application that interfaces with search engine 20 or an applet/application that is executed within search engine 20.

The instruction sets and subroutines of search engine 20, which may be configured as one or more software modules, and which may be stored on storage device 16 coupled to server computer 12 may be executed by one or more processors (not shown) and one or more memory modules (not shown) incorporated into server computer 12.

The instruction sets and subroutines of client applications 22, 24, 26, 28, which may be configured as one or more software modules, and which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 (i.e., non-transitory computer readable media) may include but are not limited to: hard disk drives; solid state drives; tape drives; optical drives; RAID arrays; random access memories (RAM); read-only memories (ROM), compact flash (CF) storage devices, secure digital (SD) storage devices, and memory stick storage devices. Examples of computing devices 38, 40, 42, 44 may include, but are not limited to, personal computer 38, laptop computer 40, personal digital assistant 42, notebook computer 44, a data-enabled, cellular telephone (not shown), and a dedicated network device (not shown), for example. Using client applications 22, 24, 26, 28, users 46, 48, 50, 52 may, for example, perform a search via a portal having selectable and/or configurable portlets, which may provide results relevant to the portlets.

Users 46, 48, 50, 52 may access search engine 20 directly through the device on which the client application (e.g., client applications 22, 24, 26, 28) is executed, namely client electronic devices 38, 40, 42, 44, for example. Users 46, 48, 50, 52 may access search engine 20 directly through network 14 or through secondary network 18. Further, server computer 12 (i.e., the computer that executes search engine 20 and/or portal page process 10) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft® Windows®, Microsoft Windows CE®, Red Hat® Linux®, or a custom operating system (Windows CE is a registered trademark of Microsoft Corporation in the United States, other countries, or both).

For the purpose of the following description, client application 22 may be discussed. However, this is for illustrative purposes only and should not be construed as a limitation of the present disclosure, as other client applications (e.g., client applications 24, 26, 28) may be equally utilized.

Figure 2:
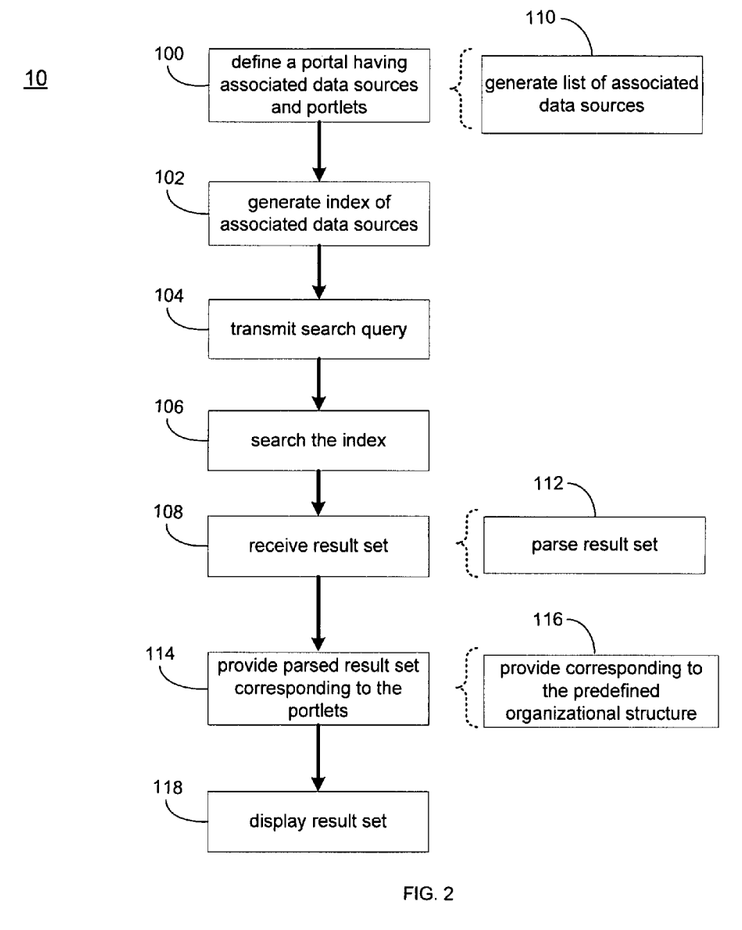
FIG. 2 is a flow chart of a process performed by the portal page process of FIG. 1.

Referring also to FIG. 2, portal page process 10 generally may define 100 a portal having one or more associated data sources, the portal including one or more portlets for displaying information associated with the one or more associated data sources. Portal page process 10 may also generate 102 an index of the one or more associated data sources. Portal page process 10 may further transmit 104 a search query to a search engine. Additionally, the index may be searched 106 for data associated with the search query. A result set may be received 108 by portal page process 10 based, at least in part, upon the index and the data associated with the search query.

Figure 3:
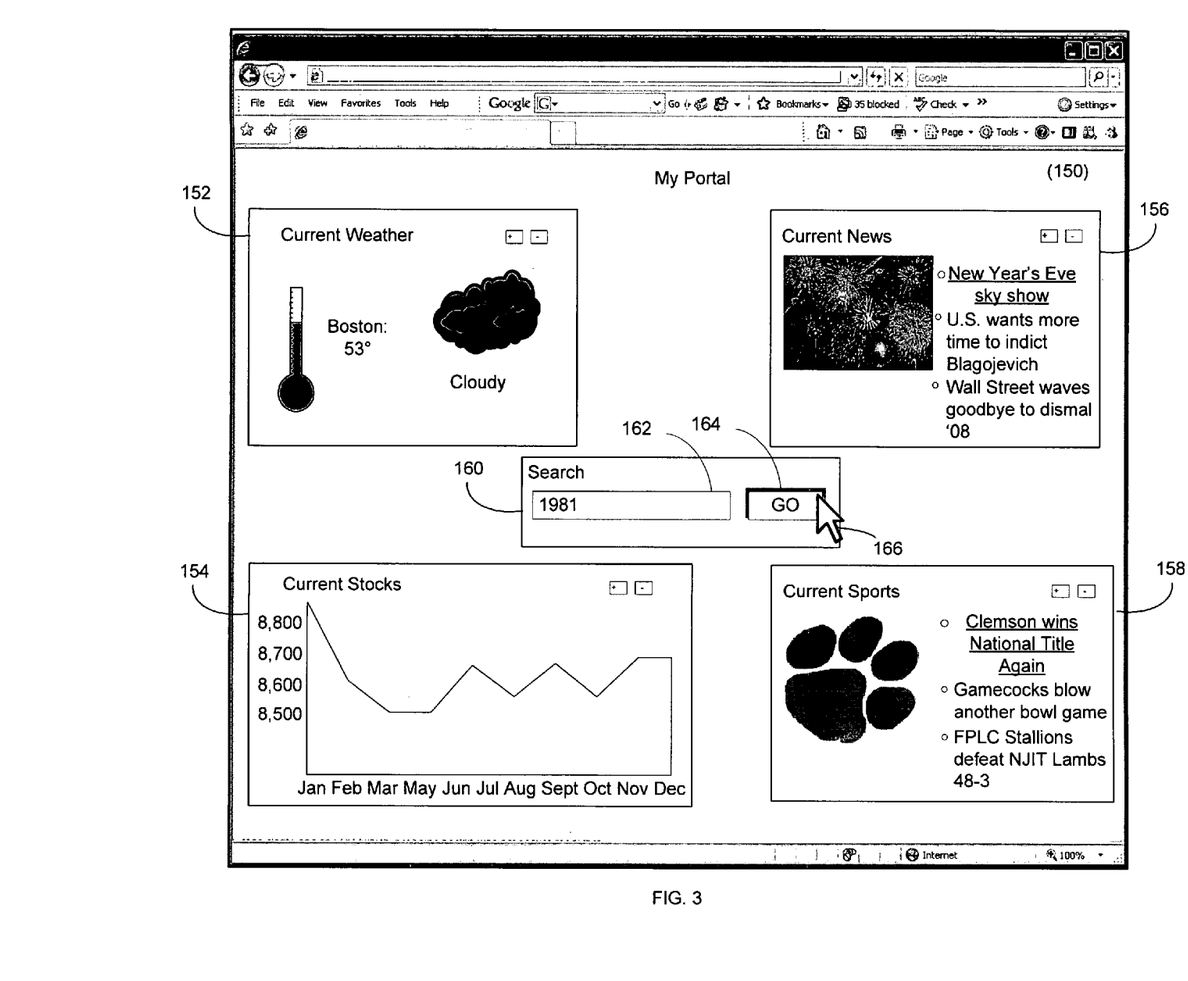
FIG. 3 diagrammatically depicts a portal page user interface that may be rendered by the portal page process of FIG. 1.

Referring also to FIG. 3, portal page process 10 may define 100 a portal (e.g., portal page 150). As is known, portals may generally present information from diverse sources in a unified way, typically through the use of portlets. For example, portal page 150 may include various portlets, including, but not limited to: weather portlet 152, stock portlet 154, news portlet 156, sports portlet 158, and search portlet 160. Portlets (e.g., weather portlet 152, stock portlet 154, news portlet 156, and sports portlet 158) may each have one or more associated data sources. Further, the one or more portlets (e.g., weather portlet 152, stock portlet 154, news portlet 156, and sports portlet 158) may provide information to portal page process 10 (e.g., from the one or more associated data sources corresponding to respective portlets) that may pertain to their respective descriptors. For example, weather portlet 152 may provide information from a weather-related data source (e.g., www.weather.com), stock portlet 154 may provide information from a stock-related data source (e.g., www.ameritrade.com), news portlet 156 may provide information from a news-related data source (e.g., www.foxnews.com), sports portlet 158 may provide information from a sports-related data source (e.g., www.espn.com). As will be discussed in greater detail below, search portlet 160 may provide information relevant to the associated data sources of the other portlets (e.g., weather portlet 152, stock portlet 154, news portlet 156, and sports portlet 158).

The portal (e.g., portal page 150) may include a predefined organizational structure of the one or more portlets (e.g., weather portlet 152, stock portlet 154, news portlet 156, sports portlet 158, and search portlet 160) within the portal. For example, as shown in FIG. 3, portal page 150 may depict a number of portals that may be arranged in a predefined organizational structure (e.g., news portlet 156 may be located in the upper-right hand portion of portal page 150; sports portlet 158 may be located in the lower-right hand portion of portal page 150; and so on). As mentioned above, and as used herein, the term "predefined" includes, but is not limited to: default settings imposed by the portal, and user selection of the layout of portlets. Accordingly, "predefined" is not to be construed as a limitation of the present disclosure. Further, while portal page 150 may have a predefined organizational structure, the quantity, type, or layout/placement of the portlets (e.g., weather portlet 152, stock portlet 154, news portlet 156, sports portlet 158, and search portlet 160) described and/or illustrated herein is not to be construed as a limitation of the present disclosure. At least the quantity, type, and layout of portlets within a portal may vary depending on any number of variables including, but not limited to: restrictions and/or default settings imposed by the portal; user selection of portlets and their layouts; and bandwidth limitations that may limit the availability and/or quantity of portlets within a portal.

Figure 4:
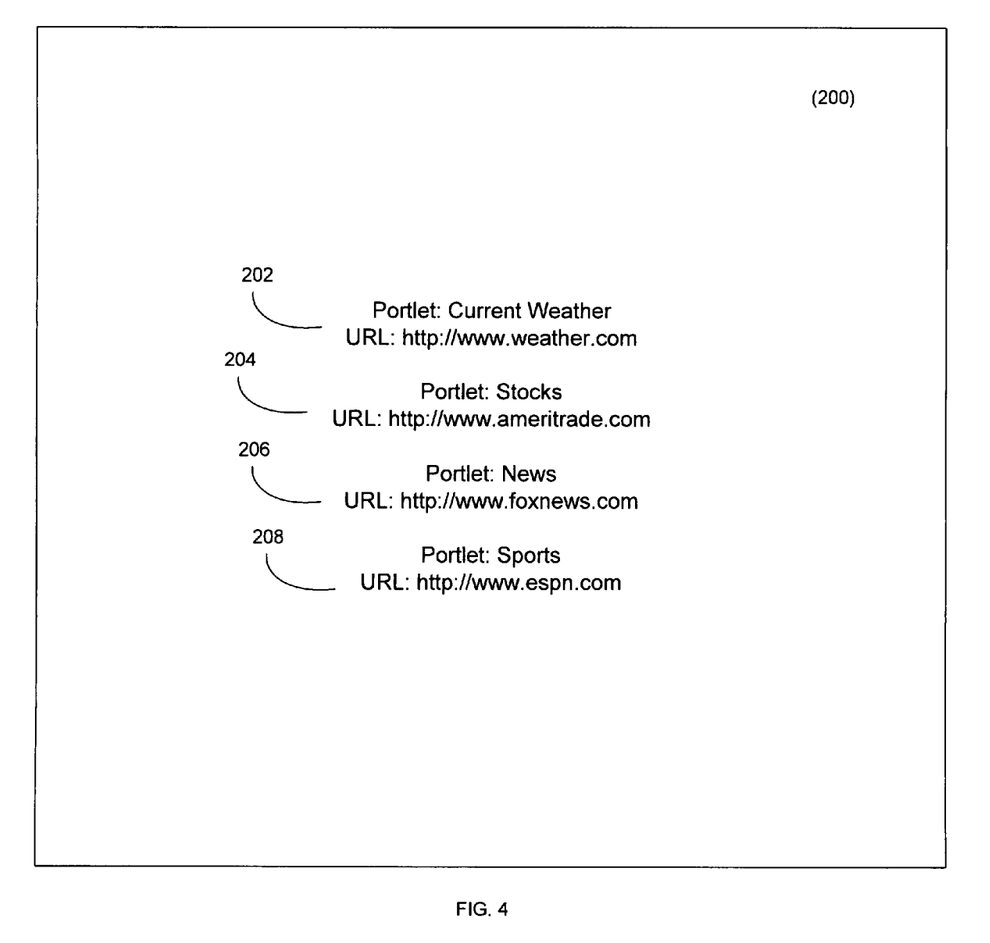
FIG. 4 diagrammatically depicts a list of associated data sources generated by the portal page process of FIG. 1.
Figure 5:
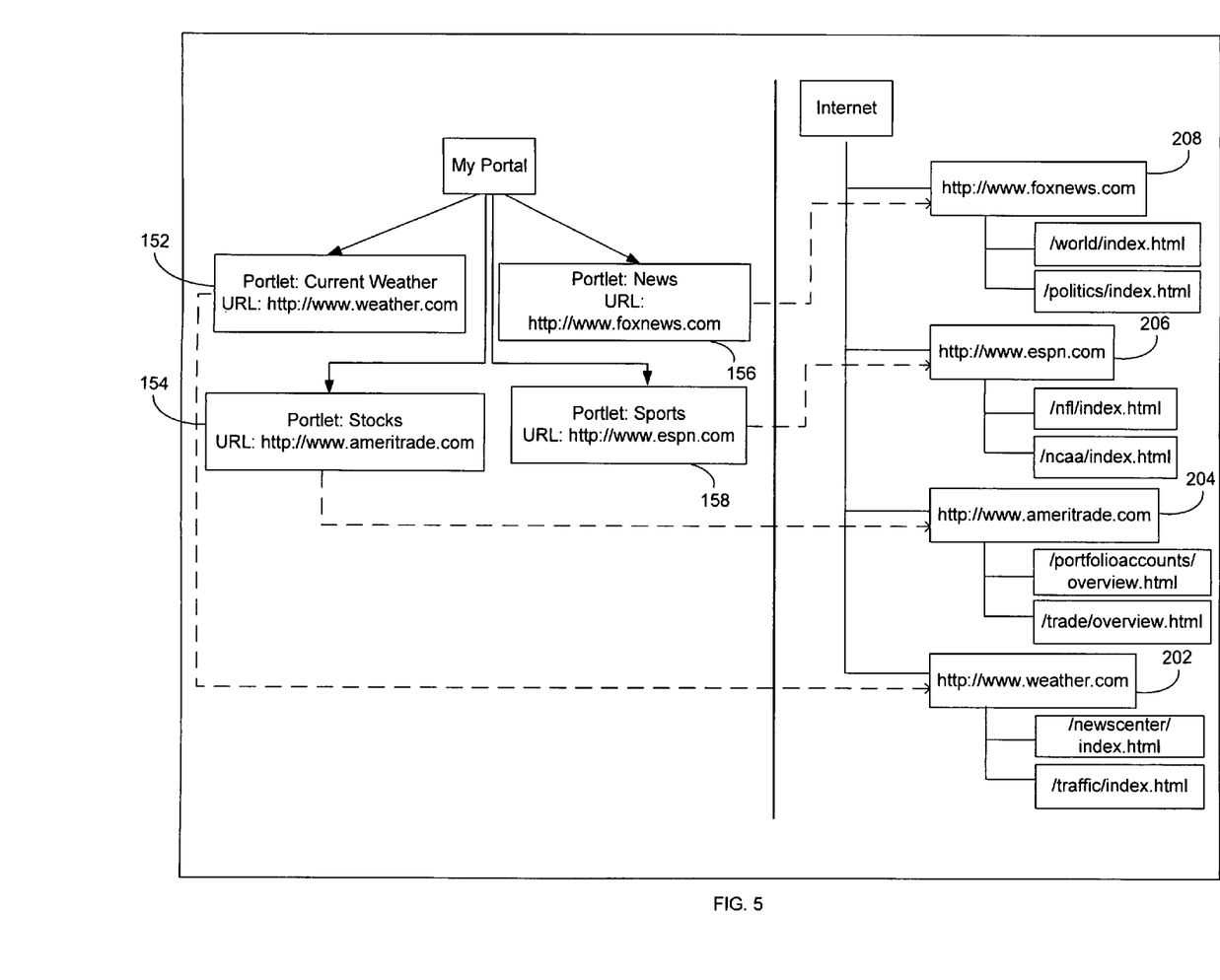
FIG. 5 diagrammatically depicts a hierarchical structure of the portlets and data associated with the associated data sources generated by the portal page process of FIG. 1.

As discussed above, the portal (e.g., portal page 150) may include one or more associated data sources. Referring also to FIGS. 4 & 5, portal page process 10 may also generate 110 list 200 of the one or more associated data sources. The one or more associated data sources (e.g., associated data sources 202, 204, 206, 208) of the one or more portlets may include, but is not limited to, a uniform resource locator "URL" and/or a location of a file on a storage device (not shown). Thus, for example, sports portlet 158 may have an associated data source 208 of http://www.espn.com. Accordingly, portal page process 10 may generate 110 list 200 of URLs for one or more of the portlets within portal page 150. As shown in FIG. 5, the associated data source (e.g., associated data sources 202, 204, 206, 208) may include a hierarchal content structure (e.g., in which each data source may include a variety of content that may be organized in various manners, as will be understood).

While the exemplary portlets (e.g., portlets 152, 154, 156, 158) are external portlets, e.g., which may include external websites as associated data sources (e.g., data sources 202, 204, 206, 208), this is for illustrative purposes only, and should not be construed as a limitation of the present disclosure. It will be appreciated that the portal (e.g., portal page 150) may include one or more portlets including an associated data source that may be, for example, a document library, an internal web content management system, or other suitable associated data source.

Figure 6:
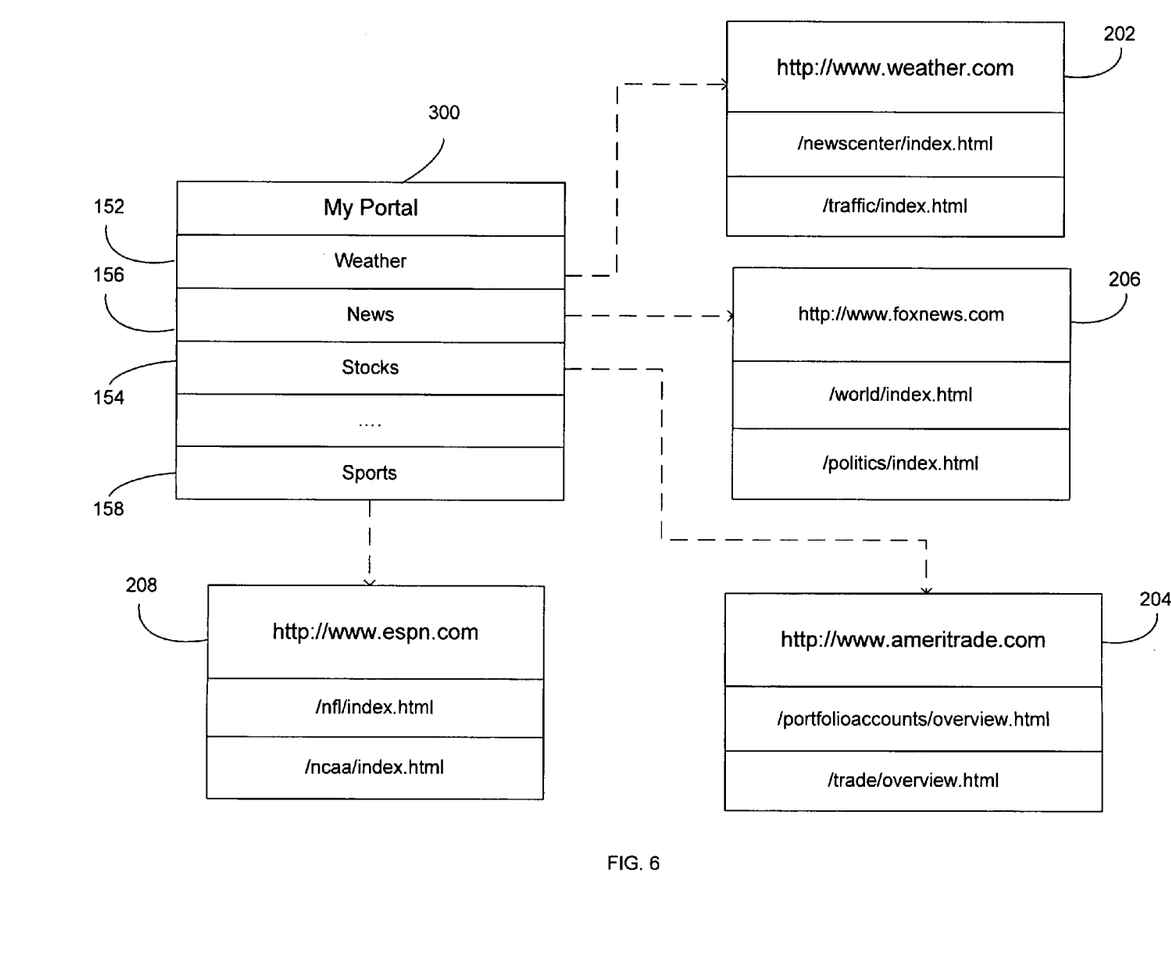
FIG. 6 diagrammatically depicts an index of the portlets and associated data sources generated by the portal page process of FIG. 1.

Further, and referring also to FIG. 6, portal page process 10 may generate 102 an index (e.g., index 300) of the one or more associated data sources. As depicted in FIG. 6, index 300 may include, but is not limited to: the one or more portlets (e.g., weather portlet 152, stock portlet 154, news portlet 156, and sports portlet 158); the one or more associated data sources (e.g., associated data sources 202, 204, 206, 208); and any/all of the content retained by the one or more associated data sources. For example, index 300 may include sports portlet 158. As shown in the respective figures, this is not limited to an index of the content of, e.g., http://www.espn.com, but also all of the "child" pages that derive from that URL. That is, index 300 may also include content from, e.g., http://www.espn.com/nfl/index.html, http://www.espn.com/ncaa/index.html, and so on.

Additionally, the content stored within the index (e.g., index 300) may include, but is not limited to: URLs of relevant web pages; metadata (e.g., title, author, date of authorship, etc.) of relevant web pages; and keywords from relevant web pages. As shown in FIGS. 4 & 5, index 300 of the one or more portlets (e.g., weather portlet 152, stock portlet 154, news portlet 156, and sports portlet 158) and the one or more associated data sources (e.g., associated data sources 202, 204, 206, 208) may be aggregated into a hierarchical content structure. However, the hierarchical content structure (e.g., as shown in FIG. 5) may be translated into a flat list (e.g., index 300), as illustrated in FIG. 6.

Further, portal page process 10 may generate 102, e.g., index 300 prior to receiving input from a user (e.g., users 46, 48, 50, 52). Generation 102 of index 300 may enable portal page process 10 to provide relevant data to search engine 20 in a much more efficient fashion than, e.g., dynamically generating 102 index 300 upon receiving input from a user.

In addition to providing a user (e.g., user 46) with a variety of customizable information, e.g., via the various portlets, portal page process 10 may also allow user 46 to conduct various searches, for example, using search portlet 160. For example, user 46 may utilize portal page process 10 (via client application 22) to access portal page 150. User 46, wishing to perform a search relative to the year 1981, may enter (e.g., using a keyboard; not shown) the search term "1981" into search field 162 of search portlet 160, and select, e.g., Go button 164 by positioning onscreen pointer 166 (e.g., which may be controlled by a pointing device, such as a mouse; not shown) over "GO" in portal page 150 and left-clicking. In response to user 46 providing a search term (e.g., the search term "1981"), and selecting GO button 164, portal page process 10 may transmit 104 a search query to search engine 20.

Continuing with the above-stated example, portal page process 10 may transmit 104 a search query to a search engine (e.g., search engine 20). Upon receiving the search query (e.g., the search term "1981"), search engine 20 may search 106 the index (e.g., index 300) for data associated with the search query. That is, upon receiving the search term (e.g., "1981") from search portlet 160, portal page process 10 may transmit 104 a search query based, at least in part, upon index 300, and the user provided search term, to search engine 20.

Transmitting 104 a search query based, at least in part, upon the index (e.g., index 300) to the search engine may also include transmitting the generated 106 list of associated data sources to the search engine. For example, portal page process 10 may include list 200 of the one or more associated data sources (e.g., associated data sources 202, 204, 206, 208) as a parameter of the search query transmitted 104 to search engine 20. However, this is not intended to be a limitation of the present disclosure, as portal page process 10 may additionally/alternatively include the one or more associated data sources of the one or more portlets in the search query without list 200.

Upon receiving the search query from portal page process 10, search engine 20 may perform a search based, at least in part, upon the transmitted 104 index (e.g., index 300) for data associated with the search query. As mentioned above, search engine 20 may perform the search, or search engine 20 may interface with one or more third-party search utilities (e.g., Google Web Search Engine) to perform the search. Although the following description involves search engine 20 interfacing with a third-party search utility, this is not intended to be a limitation of the present disclosure.

Portal page process 10 may receive 108 a result set, which may be based, at least in part, upon the index (e.g., index 300) and the data associated with the search query. For example, search engine 20 may receive a result set, the result set based, at least in part, upon index 300 and the data associated with the search query from one or more third-party search utilities. The result set may include, but is not limited to: URLs of relevant web pages; metadata (e.g., title, author, date of authorship, etc.) of relevant web pages; and keywords from relevant web pages. To perform the search, search engine 20 may transmit the search query (e.g., including the search term "1981") to, e.g., Google Web Search Engine (not shown), which may perform a search. The third-party search utility (e.g., Google Web Search Engine) may return a result set based, at least in part, upon index 300 and the data associated with the search query (e.g., which may be based, at least in part, upon the search term "1981" and upon the one or more associated data sources), and search engine 20 may transmit the search result set to portal page process 10.

Portal page process 10 may further parse 112 the result set based, at least in part, upon the list of the one or more associated data sources. Parsing 112 the result set may include, for example, portal page process 10 sending parsing instructions to search engine 20. Consistent with the parsing instructions, upon receiving the result set (as will be discussed in greater detail below), search engine 20 may parse the result set based, at least in part, upon the list (e.g., list 200) of the one or more associated data sources (e.g., associated data sources 202, 204, 206, 208). For example, assume that a large number of results are returned (e.g., from the third-party search utility) in response to the search query. Thus, portal page process 10 (alone, or as discussed above, in conjunction with search engine 20) may parse 112 the result set based upon, e.g., list 200, to generate a result set that may be scoped to the one or more associated data sources within list 200. Accordingly, for example, the parsed 112 result set may only include results relevant to e.g., the weather in 1981, stock prices in 1981, the news from 1981, and/or sports headlines from 1981.

While the above-stated example discusses portal page process 10 parsing 112 the result set (e.g., by sending parsing instructions to search engine 20) after receiving a large number of results to the search query, this is not intended to be a limitation of the present disclosure. For example, portal page process 10 may transmit 104 the search query (e.g., including the search term "1981") to search engine 20 (e.g., and to one or more third-party search utilities) with the included list (e.g., list 200) of associated data sources (e.g., associated data sources 202, 204, 206, 208) as search parameters. As such, portal page process 10 (alone or in conjunction with search engine 20) may parse 112 a received 108 result set and/or may send parsing instructions such that a parsed result set may be received 108, e.g., from a third-party search utility (e.g., the received 108 result set may only include results relevant to the one or more associated data sources).

Portal page process 10 may provide 114 the parsed result set corresponding to the one or more portlets (e.g., weather portlet 152, stock portlet 154, news portlet 156, and sports portlet 158), e.g., via portal page 150. For example, portal page process 10 may provide 114 the parsed 112 result set such that individual results of the result set may be partitioned so as to be associated with each of the one or more portlets. For example, the results relevant to, e.g., the weather in 1981 may be provided 110 as a first set of results, the results relevant to, e.g., stock prices in 1981 may be provided 110 as a second set of results, and so on.

Figure 7:
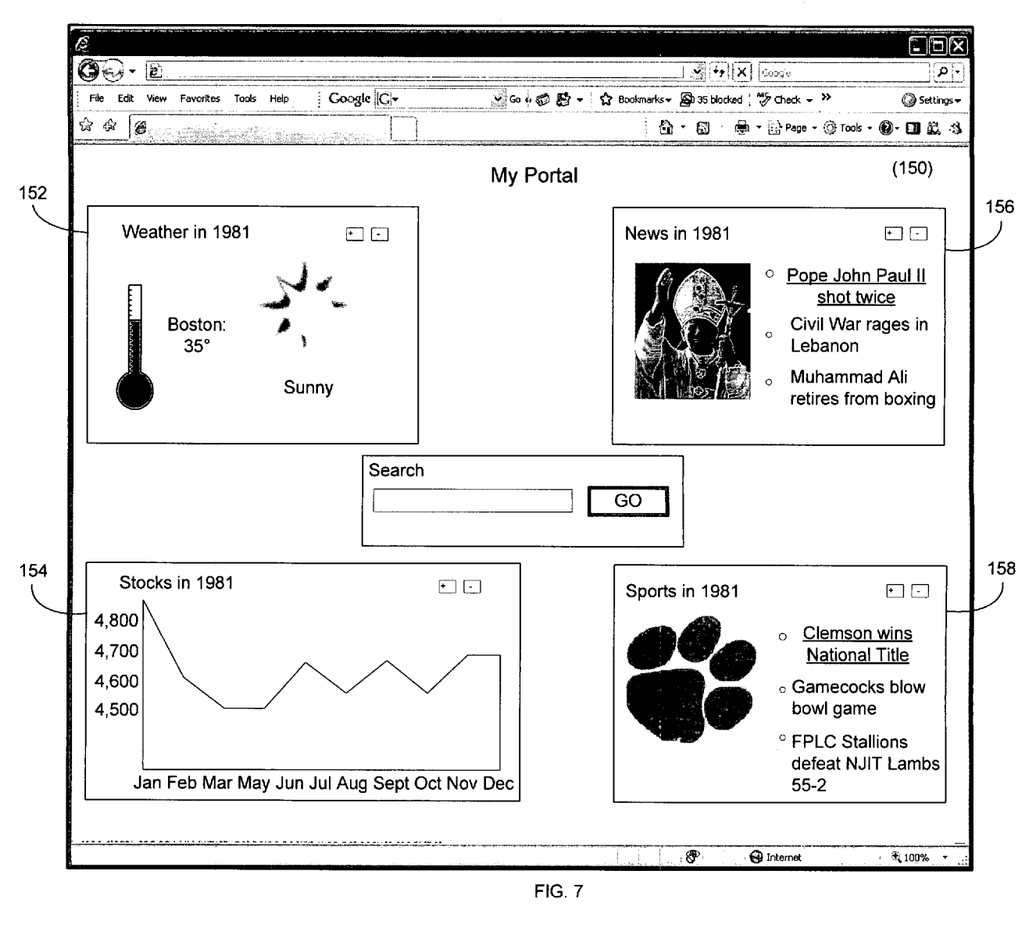
FIG. 7 diagrammatically depicts a portal page user interface that may be rendered by the portal page process of FIG. 1.

Further, and referring also to FIG. 7, portal page process 10 may provide 116 the parsed 112 result set corresponding, at least in part, to the predefined organizational structure of the one or more portlets (e.g., weather portlet 152, stock portlet 154, news portlet 156, and sports portlet 158) within the portal (e.g., portal page 150). For example, the results of the parsed 112 result set relative to, e.g., the weather in 1981 may be provided 116 corresponding to the position of weather portlet 152 within portal page 150. The results corresponding to the other portlets (e.g., stock portlet 154, news portlet 156, and sports portlet 158) may be similarly provided 116 corresponding to the position of the respective portlets. Portal page process 10 may display 118 the result set on a client electronic device (e.g., client electronic devices 38, 40, 42, 44).

Figure 8:
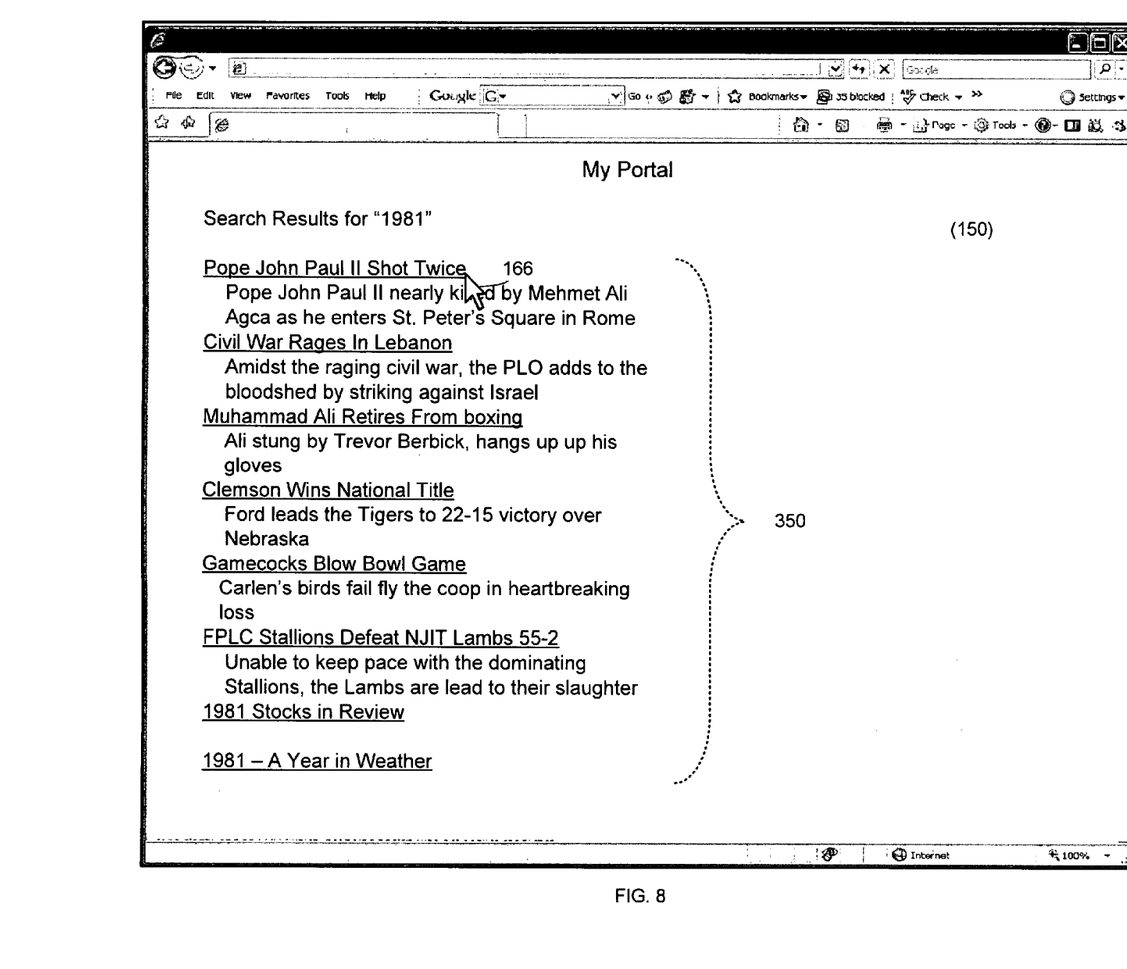
FIG. 8 diagrammatically depicts a portal page user interface that may be rendered by the portal page process of FIG. 1.

Additionally/alternatively, portal page process 10 may display 118 the result set in a list format. For example, and referring also to FIG. 8, the results set (e.g., based upon, at least in part, the search term "1981") received 108 by portal page process 10 may be displayed in a list format (e.g., list 350). List 350 may include a unified list, e.g., in which the search results of the various associated data sources (e.g., associated data sources 202, 204, 206, 208) may be organized into a single list within portal page 150. The various results of the received 108 results set may be sorted based, at least in part, upon, e.g., relevancy, user defined preferences, system-wide preferences, or the like. The various search results may include, for example, hyperlinks. As such, a user (e.g., user 46) may select, via onscreen pointer 166, one or more of the results. Selecting one or more of the results, via onscreen pointer 166, may open the page within the associated data source (e.g., one or more of associated data sources 202, 204, 206, 208) corresponding to the selected search result.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A computer program product residing on a non-transitory computer readable medium having a plurality of instructions stored thereon which, when executed by a processor, cause the processor to perform operations comprising:
    defining a portal having one or more associated data sources, the portal including one or more portlets for displaying information associated with the one or more associated data sources, wherein the portal uses predefined organizational settings associated with the one or more portlets within the portal;
    generating an index of the one or more associated data sources;
    transmitting a search query based, at least in part, upon the index and a user-provided search term to a search engine;
    receiving a result set based, at least in part, upon the index and the data associated with the search query from the search engine;
    parsing the received result set from the search engine; and
    transmitting a subset of the parsed result set to a corresponding portlet, at least in part, using the predefined organizational settings associated with the one or more portlets within the portal.

2. The computer program product of claim 1, wherein the instructions for defining the portal further comprise instructions for generating a list of the one or more associated data sources.

3. The computer program product of claim 2, further including instructions for parsing the received result set based, at least in part, upon the list of the one or more associated data sources.

4. The computer program product of claim 3, further comprising instructions for transmitting the subset of the parsed result set to the corresponding portlet of the one or more portlets based, at least in part, upon the list of the one or more associated data sources.

5. A computing system comprising:
    a processor;
    a memory module coupled with the processor;
    a first software module executable by the processor and the memory module, wherein the first software module is configured to define a portal having one or more associated data sources, the portal including one or more portlets for displaying information associated with the one or more associated data sources, wherein the portal uses predefined organizational settings associated with the one or more portlets within the portal;
    a second software module executable by the processor and the memory module, wherein the second software module is configured to generate an index of the one or more associated data sources;
    a third software module executable by the processor and the memory module, wherein the third software module is configured to transmit a search query based, at least in part, upon the index and a user-provided search term to a search engine;
    a fourth software module executable by the processor and the memory module, wherein the fourth software module is configured to receive a result set based, at least in part, upon the index and the data associated with the search query from the search engine;
    a fifth software module executable by the processor and the memory module, wherein the fifth software module is configured to parse the received result set from the search engine; and
    a sixth software module executable by the processor and the memory module, wherein the sixth software module is configured to transmit a subset of the parsed result set to a corresponding portlet, at least in part, using the predefined organizational settings associated with the one or more portlets within the portal.

6. The computing system of claim 5, wherein the first software module, configured to define the portal is further configured to generate a list of the one or more associated data sources.

7. The computing system of claim 6, wherein the fifth software module, configured to parse the received result set is further configured to parse the received result set based, at least in part, upon the list of the one or more associated data sources.

8. The computing system of claim 7, wherein the sixth software module, configured to transmit the subset of the parsed result set to the corresponding portlet of the one or more portlets is further configured to transmit the subset of the parsed results set to the corresponding portlet of the one or more portlets based, at least in part, upon the list of the one or more associated data sources.

9. A computer implemented method comprising:
    defining a portal having one or more associated data sources, the portal including one or more portlets for displaying information associated with the one or more associated data sources, wherein the portal uses predefined organizational settings associated with the one or more portlets within the portal;
    generating an index of the one or more associated data sources;
    transmitting a search query based, at least in part, upon the index and a user-provided search term to a search engine;
    receiving a result set based, at least in part, upon the index and the data associated with the search query from the search engine;
    parsing the received result set from the search engine;
    transmitting a subset of the parsed result set to a corresponding portlet, at least in part, using the predefined organizational setting associated with the one or more portlets within the portal; and
    displaying the result set on a client electronic device.

10. The computer implemented method of claim 9, wherein defining the portal further comprises:
    generating a list of the one or more associated data sources.

11. The computer implemented method of claim 10, further including:
    parsing the received result set based, at least in part, upon the list of the one or more associated data sources.

12. The computer implemented method of claim 11, further comprising:
    transmitting a the subset of the parsed result set to the corresponding portlet of the one or more portlets based, at least in part, upon the list of the one or more associated data sources.

* * * * *